US007552359B2

(12) United States Patent
Takemori

(10) Patent No.: US 7,552,359 B2
(45) Date of Patent: Jun. 23, 2009

(54) COMPUTER SYSTEM AND METHOD FOR DEALING WITH ERRORS

(75) Inventor: Yasushi Takemori, Tokyo (JP)

(73) Assignee: NEC Corporation, Tokyo (JP)

( * ) Notice: Subject to any disclaimer, the term of this patent is extended or adjusted under 35 U.S.C. 154(b) by 525 days.

(21) Appl. No.: 11/311,401

(22) Filed: Dec. 20, 2005

(65) Prior Publication Data

US 2006/0150009 A1 Jul. 6, 2006

(30) Foreign Application Priority Data

Dec. 21, 2004 (JP) ............................. 2004-368674

(51) Int. Cl.
*G06F 11/00* (2006.01)
(52) U.S. Cl. .............................. 714/11; 714/12; 714/13
(58) Field of Classification Search .............. 714/11–13
See application file for complete search history.

(56) References Cited

U.S. PATENT DOCUMENTS

| 4,914,572 | A | * | 4/1990 | Bitzinger et al. | 714/10 |
| 5,751,932 | A | * | 5/1998 | Horst et al. | 714/12 |
| 6,760,869 | B2 | * | 7/2004 | Lam | 714/42 |
| 7,139,861 | B2 | * | 11/2006 | Lee | 710/316 |
| 7,162,560 | B2 | * | 1/2007 | Taylor et al. | 710/266 |
| 7,337,243 | B2 | * | 2/2008 | Hawkins et al. | 710/14 |
| 2003/0130969 | A1 | * | 7/2003 | Hawkins et al. | 706/15 |
| 2004/0153749 | A1 | * | 8/2004 | Schwarm et al. | 714/11 |
| 2004/0153756 | A1 | * | 8/2004 | Tsukahara | 714/13 |
| 2005/0080887 | A1 | * | 4/2005 | Lee et al. | 709/223 |
| 2005/0271079 | A1 | * | 12/2005 | Teoh | 370/463 |

FOREIGN PATENT DOCUMENTS

| CN | 87101838 A | 12/1987 |
| JP | 7-200334 A | 8/1995 |
| JP | 1078914 | 3/1998 |

* cited by examiner

*Primary Examiner*—Emerson C Puente
(74) *Attorney, Agent, or Firm*—Sughrue Mion, PLLC

(57) ABSTRACT

A computer system includes a plurality of systems configured to be connected to each other by links and to operate synchronously each other. Each of said plurality of systems includes a fault tolerant controller, a CPU, a baseboard management controller and a plurality of hardware modules. The CPU is connected with the fault tolerant controller. The baseboard management controller is connected with the fault tolerant controller. The plurality of hardware modules is connected with the fault tolerant controller. When receiving a trouble which occurs in any of the plurality of systems, the fault tolerant controller outputs an interrupt regarding the trouble to at least one of the CPU and the baseboard management controller predetermined correspondingly to the trouble.

18 Claims, 15 Drawing Sheets

Fig. 3

| KIND | ERROR CAUSE | INTERRUPT REPORT DESTINATION |
|---|---|---|
| FATAL ERROR | (HEAVY TROUBLE OF CHIP SET) | CPU, BMC |
| UNCORRECTABLE ERROR [1] | (TROUBLE OF CPU OR MEMORY) | CPU, BMC |
| UNCORRECTABLE ERROR [2] | (TROUBLE OF THE I/O DEVICE) | CPU |
| NON-FATAL ERROR | (TROUBLE REGARDING DUPLICATION) | CPU, BMC |
| CORRECTABLE ERROR | (LIGHT TROUBLE THAT CAN BE CORRECTED IN HW) | BMC |

COMPUTER SYSTEM AND METHOD FOR DEALING WITH ERRORS

BACKGROUND OF THE INVENTION

1. Field of the Invention

The present invention relates to a method for dealing with errors in a computer system, and more particularly relates to a method for dealing with errors used in a multiplexed computer system.

2. Description of the Related Art

It is known that there is a computer system having a high reliability such as a fault tolerant computer system. In the fault tolerant computer system, all of hardware modules constituting the system are duplicated or multiplexed. All of the hardware modules are synchronously operated. For this reason, for example, even if a certain portion of the system is troubled, the hardware module with the trouble can be separated, thereby continuing the process under the normal hardware modules. Thus, the tolerance for the trouble is improved.

Errors occurring in the computer system have various levels of influences on the system. If the same method is used to deal with all the errors, the method for dealing with the errors having the high influence level must be used. In this case, the method unnecessarily thoroughly deals with the error, even though the error has the low influence level. This makes the burden on the system unnecessarily large, which leads to the possibility that the processing performance is excessively influenced. Thus, a technique is desired, which can deal with the error correspondingly to the influence level on the system.

In conjunction with the above description, Japanese Laid-Open Patent Application (JP-A-Heisei, 7-200334) discloses a dually synchronous driving method. In this dually synchronous driving method, two processor groups, which are substantially equal to each other, are driven synchronously with each other by the same command and the same data input. One of the two processor groups is assigned to an active group, and the other is assigned to a standby group. A trouble detecting circuit for detecting a hardware trouble is connected to each of the two processor groups. Here, if the hardware trouble occurs in a processor group, an operation cannot be normally continued in the processor group. Each of the two processors contains a first controller and a second controller. The first controller belonging to the active group executes an interrupting process based on a detection output from the trouble detecting circuit of the active group, releases the synchronous state, and then stops displaying the active group. The second controller belonging to the standby group starts displaying the active group based on the detection output from the trouble detecting circuit of a partner's group, and then continues the operation at a single mode.

SUMMARY OF THE INVENTION

It is therefore an object of the present invention to provide a computer system and a method for dealing with an error, which can change a destination of an interrupt report regarding an error in a multiplexed computer system based on an influence level on the system.

Also, another object of the present invention is to provide a computer system and a method for dealing with an error, which can deal with an error based on an influence level on the system.

This and other objects, features and advantages of the present invention will be readily ascertained by referring to the following description and drawings.

In order to achieve an aspect of the present invention, the present invention provides a computer system including a plurality of systems configured to be connected to each other by links and to operate synchronously each other. Each of the plurality of systems includes: a fault tolerant controller; a CPU configured to be connected with the fault tolerant controller; a baseboard management controller configured to be connected with the fault tolerant controller; and a plurality of hardware modules configured to be connected with the fault tolerant controller. When receiving a trouble which occurs in any of the plurality of systems, the fault tolerant controller outputs an interrupt regarding the trouble to at least one of the CPU and the baseboard management controller predetermined correspondingly to the trouble.

In the computer system, the fault tolerant controller may include: a trouble detecting circuit configured to judges a cause and a kind of the trouble; an error cause storage unit configured to store the cause and the kind, and an interrupt switching circuit configured to output the interrupt to the at least one of the CPU and the baseboard management controller predetermined correspondingly to the kind of the trouble.

In the computer system, when the trouble occurs in the other system of the plurality of systems, the trouble detecting circuit may separate the other system in which the trouble occurs. The interrupt switching circuit may output the interrupt to the CPU and the baseboard management controller.

In the computer system, when the trouble occurs in one of the CPU and a memory as one of the plurality of hardware modules, the trouble detecting circuit may separate the one of the CPU and the memory in which the trouble occurs. The interrupt switching circuit may output the interrupt to the CPU and the baseboard management controller.

In the computer system, when the trouble occurs in an I/O device as one of the plurality of hardware modules, the trouble detecting circuit may separate the I/O device in which the trouble occurs. The interrupt switching circuit may output the interrupt to the CPU.

In the computer system, the fault tolerant controller may further include a CPU module mode storage unit configured to store a CPU mode data indicating which of an active CPU and a standby CPU the CPU connected with the fault tolerant controller is. When the trouble is related to a multiplexing of the plurality of systems, the interrupt switching circuit may output the interrupt to the CPU which is connected with the interrupt switching circuit, based on the CPU mode data in the CPU module mode storage unit.

In the computer system, when the trouble is light trouble that can be corrected by one of the plurality of hardware modules, the interrupt switching circuit may output the interrupt to the baseboard management controller.

In the computer system, the at least one of the CPU and the baseboard management controller which receives the interrupt regarding the trouble may read the cause from the error cause storage unit and may carry out processes with regard to the trouble correspondingly to the cause.

In the computer system, the fault tolerant controller may further include: a visible setting storage unit configured to mask the cause based on the kind when the CPU reads the cause from the error cause storage unit.

In order to achieve another aspect of the present invention, the present invention provides a method for dealing with errors, including: (a) judging a cause and a kind of a trouble, when the trouble occurs in any of a plurality of systems included in a computer system, wherein the plurality of systems is connected to each other by links and operates synchronously each other; and (b) outputting an interrupt regarding the trouble to at least one destination predetermined correspondingly to the kind of the trouble.

The method for dealing with errors may further include: (c) carrying out processes regarding the trouble correspondingly to the cause, by the at least one destination.

In the method for dealing with errors, each of the plurality of systems may include: a fault tolerant controller; a CPU configured to be connected with the fault tolerant controller; a baseboard management controller configured to be connected with the fault tolerant controller; and a plurality of hardware modules configured to be connected with the fault tolerant controller. The step (b) may include: (b1) outputting the interrupt to at least one of the CPU and the baseboard management controller predetermined correspondingly to the kind of the trouble, by the fault tolerant controller.

In the method for dealing with errors, the fault tolerant controller may include: a trouble detecting circuit; an error cause storage unit configured to be connected with the trouble detecting circuit, and an interrupt switching circuit configured to be connected with the error cause storage unit. The step (a) may include: (a1) judging the cause and the kind by the trouble detecting circuit, and (a2) storing the cause and the kind by the error cause storage unit. The step (b1) may include: (b11) outputting the interrupt to the at least one of the CPU and the baseboard management controller by the interrupt switching circuit.

In the method for dealing with errors, when the trouble occurs in the other system of the plurality of systems, the step (b1) may further include: (b12) separating the other system in which the trouble occurs by the trouble detecting circuit, and (b13) outputting the interrupt to the CPU and the baseboard management controller by the interrupt switching circuit.

In the method for dealing with errors, when the trouble occurs in one of the CPU and a memory as one of the plurality of hardware modules, the step (b1) may further include: (b14) separating the one of the CPU and the memory in which the trouble occurs by the trouble detecting circuit, and (b15) outputting the interrupt to the CPU and the baseboard management controller by the interrupt switching circuit.

In the method for dealing with errors, when the trouble occurs in a I/O device as one of the plurality of hardware modules, the step (b1) may further include: (b16) separating the I/O device in which the trouble occurs by the trouble detecting circuit, and (b17) outputting the interrupt to the CPU by the interrupt switching circuit.

In the method for dealing with errors, the fault tolerant controller may further include: a CPU module mode storage unit configured to store a CPU mode data indicating which of an active CPU and a standby CPU the CPU connected with the fault tolerant controller is. When the trouble is related to a multiplexing of the plurality of systems, the step (b1) may further include: (b18) circuit outputting the interrupt to the CPU which is connected with the interrupt switching circuit, based on the CPU mode data in the CPU module mode storage unit, by the interrupt switching.

In the method for dealing with errors, when the trouble is light trouble which can be corrected by one of the plurality of hardware modules, the step (b1) may further include: (b19) outputting the interrupt to the baseboard management controller by the interrupt switching circuit.

The method for dealing with errors may further include: (c) reading the cause from the error cause storage unit and carrying out processes with regard to the trouble correspondingly to the cause by the at least one of the CPU and the baseboard management controller which receives the interrupt.

In the method for dealing with errors, the fault tolerant controller may further include: a visible setting storage unit. The step (c) may include: (c1) masking the cause based on the kind when the CPU reads the cause from the error cause storage unit by the visible setting storage unit.

BRIEF DESCRIPTION OF THE DRAWINGS

FIG. 3 is a table showing the error table;

DESCRIPTION OF THE PREFERRED EMBODIMENTS

Embodiments of a computer system and a method for dealing with errors in a computer system of the present invention will be described below with reference to the attached drawings.

Figure 1:
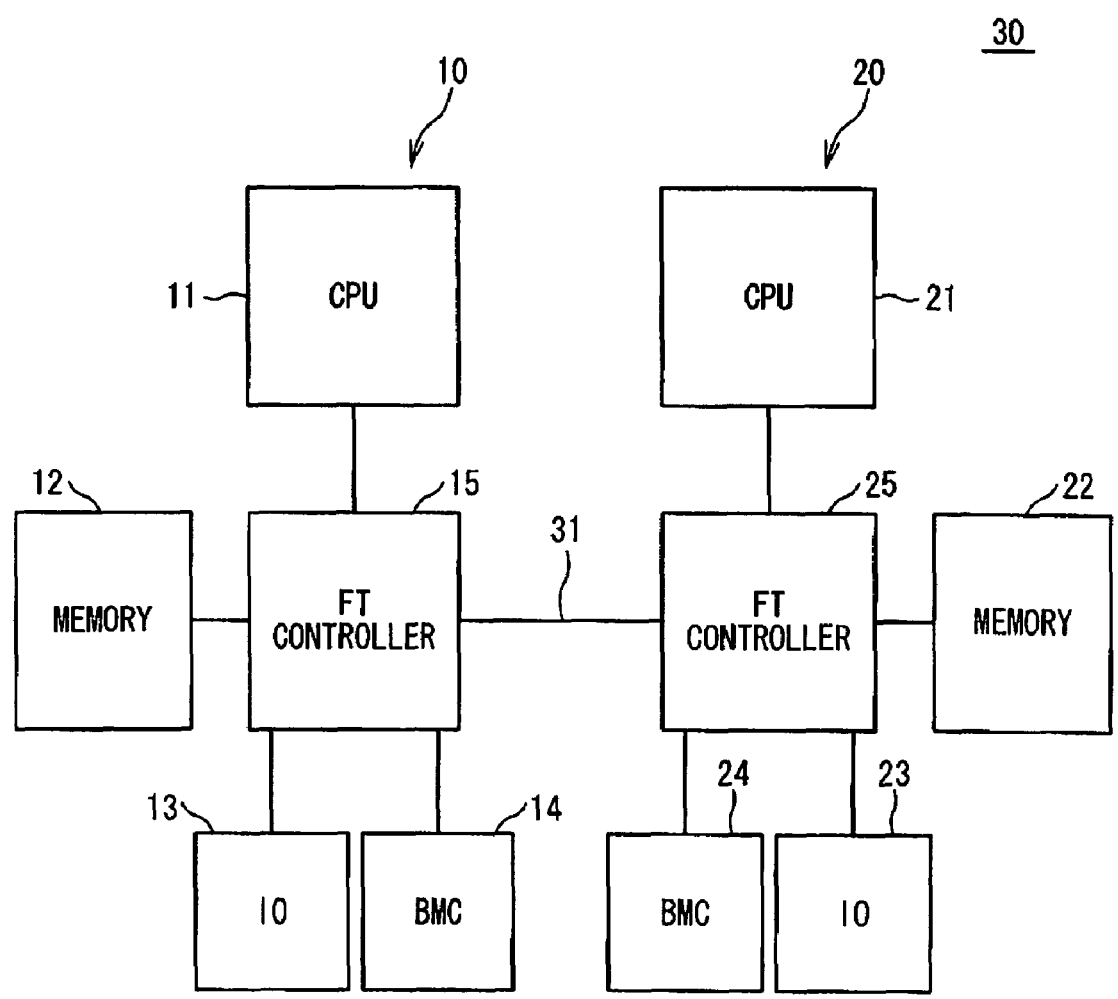
FIG. 1 is a block diagram showing the configuration of the embodiment of the computer system of the present invention.

A configuration of the embodiment of the computer system of the present invention is explained. FIG. 1 is a block diagram showing the configuration of the embodiment of the computer system of the present invention. Here, a duplicated fault tolerant computer system is explained as an example of the computer system of the present invention.

A fault tolerant computer system 30 has a first system 10 and a second system 20. The first system 10 and the second system 20 are synchronously operated and connected so as to be able to transmit/receive signals through a link 31.

The first system 10 includes hardware modules, such as a fault tolerant controller (hereinafter, referred to as a FT controller) 15, a CPU (central processing unit) 11, a memory 12, an I/O device 13 and a baseboard management controller (hereafter, referred to as a BMC) 14. The FT controller 15 is connected to each hardware module (the CPU 11, the memory 12, the I/O device 13 and the BMC 14) and carries out synchronous operation processes and a process for dealing with errors when an error occurs. The process for dealing with errors is exemplified by a control with regard to an interrupt and a control with regard to a switching.

Similarly, the second system 20 includes hardware modules, such as a FT controller 25, a CPU 21, a memory 22, an I/O device 23 and a BMC 24. The FT controller 25 is connected to each hardware module (the CPU 21, the memory 22, the I/O device 23 and the BMC 24) and carries out the synchronous operation processes and the process for dealing with errors when an error occurs. The process for dealing with errors is exemplified by a control with regard to an interrupt and a control with regard to a switching.

The FT controller 15 and the FT controller 25 are connected through the link 31 and carry out the synchronous operation processes and the process for dealing with errors when an error occurs. The process for dealing with errors is exemplified by a control with regard to an interrupt and a control with regard to a switching.

Figure 2:
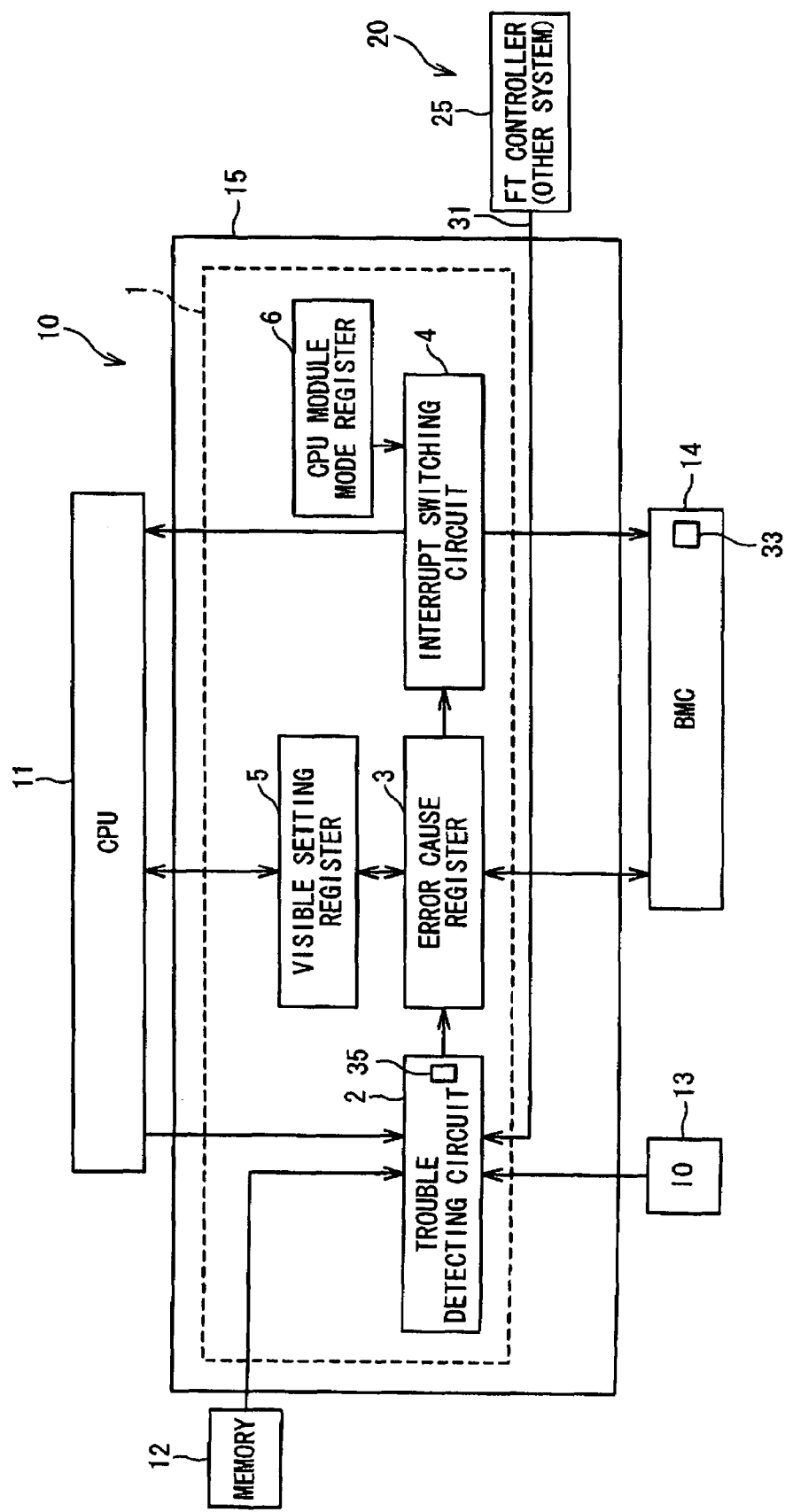
FIG. 2 is a block diagram showing the configuration of the first system in the present invention.

The configuration for executing the method (process) for dealing with errors of the present invention in the FT controller 15 will be described below. Incidentally, since that of the FT controller 25 is also similar, its explanation is omitted. FIG. 2 is a block diagram showing the configuration of the first system 10 in the present invention. The FT controller 15 includes a processing circuit 1 for detecting an error and carrying out a process with regard to the error. The processing circuit 1 includes a trouble detecting circuit 2, an error cause register 3, an interrupt switching circuit 4, a visible setting register 5 and a CPU module mode register 6.

The trouble detecting circuit 2 receives the data with regard to the error from any of the CPU 11, the memory 12, the I/O device 13 and the FT controller 25 in the other system. Then, if detecting the error, the trouble detecting circuit 2 judges the error cause of the detected error and the kind of the error cause. Then, the trouble detecting circuit 2 reports the detected error cause and its kind to the error cause register 3. At this time, the trouble detecting circuit 2 refers to an error table 35 to judge the kind of the detected error. The error table 35 includes the relation between error causes and kinds of errors. The detected error cause may be simultaneously transmitted to the interrupt switching circuit 4.

Further, based on the error cause, the trouble detecting circuit 2 separates the second system 20 if the error occurs in the second system 20, or separates the hardware module (for example, the CPU 11, the memory 12 or the I/O device 13) if the error occurs in the hardware, from the first system 10 under the operation. When the hardware module having the error is separated, the operations except that of the separated module are continued still in the duplicated state.

Here, the error table 35 is explained. FIG. 3 is a table showing the error table 35. The error causes 37 and the kinds 36 of the errors are related in the error table 35. The classification of the error causes into the respective kinds of the errors is set by considering the influence level on the system.

Five kinds 36 of the errors are defined based on the influence level on the system. The kinds 36 are a fatal error, an uncorrectable error [1], an uncorrectable error [2], a non-fatal error and a correctable error.

An error cause 37 resulting in the fatal error indicates a heavy trouble of a chip set including the FT controllers (15, 25). In the error table 35, the notification of the concrete error cause is omitted. In the case of the fatal error, an interrupt report destinations 38 are the CPUs (11, 21) and the BMCs (14, 24). OS (operating system) presets the interrupt report destinations 38 in the interrupt switching circuit 4.

The error cause 37 resulting in the uncorrectable error [1] indicates the trouble in the CPU (11, 21) or memory (12, 22). The notification of the concrete error cause is omitted in the error table 35. In the case of the uncorrectable error [1], the interrupt report destinations 38 are the CPUs (11, 21) and the BMCs (14, 24). The OS presets the interrupt report destinations 38 in the interrupt switching circuit 4.

The error cause 37 resulting in the uncorrectable error [2] indicates the trouble in the I/O device 13. The notification of the concrete error cause is omitted in the error table 35. In the case of the uncorrectable error [2], the interrupt report destinations 38 are the CPUs (11, 21). The OS presets the interrupt report destinations 38 in the interrupt switching circuit 4.

The error cause 37 resulting in the non-fatal error mainly indicates the trouble with regard to the duplication. The notification of the concrete error cause is omitted in the error table 35. The OS presets the interrupt report destinations 38 in the interrupt switching circuit 4. However, the OS preliminarily sets one of the two CPUs (11, 21) for the CPU (active CPU) to be mainly operated, and sets the other for the CPU (standby CPU) to be auxiliarily operated. Then, in the case of the non-fatal error, the interrupt report destinations 38 are the CPU and BMC on the active CPU side or those on the standby CPU side.

The error cause 37 resulting in the correctable error indicates the light trouble that can be corrected in the hardware module. The notification of the concrete error cause is omitted. In the case of the correctable error, the interrupt report destinations 38 are the BMCs (14, 24). The OS presets the interrupt report destinations 38 in the interrupt switching circuit 4.

With reference to FIG. 2, the CPU module mode register 6 stores the setting that the OS preliminarily sets one of the two CPUs (11, 21) for the CPU (active CPU) to be mainly operated and sets the other for the CPU (standby CPU) to be auxiliarily operated.

The error cause register 3 stores the error cause (37) and its kind (36) transmitted from the trouble detecting circuit 2. The portion where the error occurs and its cause are known from them. Then, the kind of the error is transmitted to the interrupt switching circuit 4. The BMC 14 directly reads the kind of the error from the error cause register 3. The CPU 11 reads the kind of the error from the error cause register 3 through the visible setting register 5.

The interrupt switching circuit 4 sends the interrupt to at least one of the CPU 11, the CPU 21 and the BMC 14, in reference to the setting, based on the kind of the error outputted from the error cause register 3.

Figure 4:
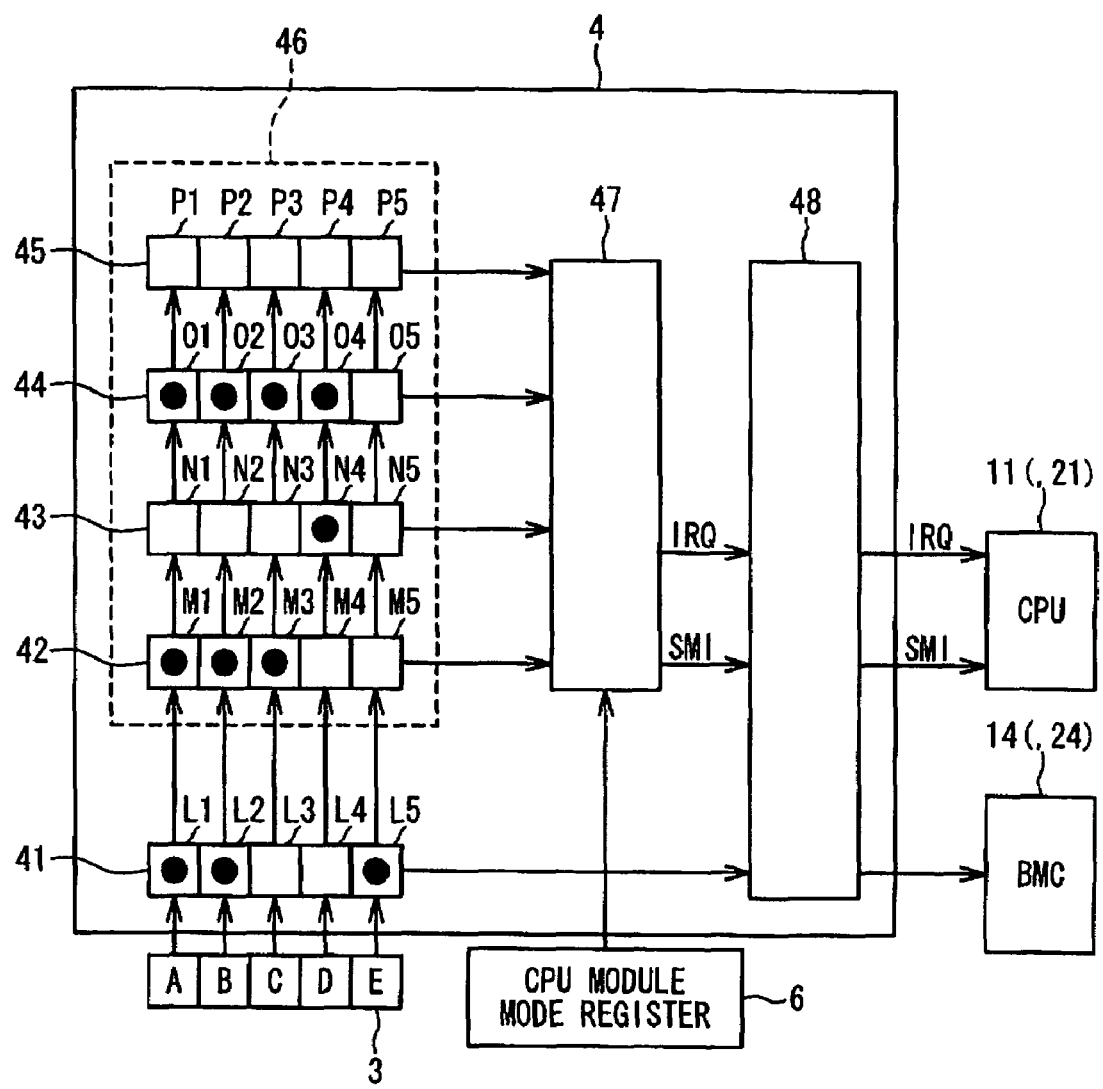
FIG. 4 is a block diagram showing the configuration of the interrupt switching circuit.

Here, the interrupt switching circuit 4 is further explained. FIG. 4 is a block diagram showing the configuration of the interrupt switching circuit 4. The interrupt switching circuit 4 includes a BMC interrupt report register 41, a CPU interrupt report register 46, an active/standby judging circuit 47, and an interrupt controller 48. The CPU interrupt report register 46 includes an active SMI interrupt report register 42, an active IRQ interrupt report register 43, a standby SMI interrupt report register 44 and a standby IRQ interrupt report register 45.

The error cause register 3 includes A to E registers corresponding to the error causes of five kinds. That is, the error causes (37) corresponding to the error kinds (36) are inputted to the A to E registers. For example, if the kind of the error cause is the fatal error, the data indicating the error cause (37) is inputted to the A register, and "0" is inputted to all of the other registers. If the kind of the error cause is the uncorrectable error [1], the data indicating the error cause (37) is inputted to the B register, and "0" is inputted to all of the other registers. If the kind of the error cause is the uncorrectable error [2], the data indicating the error cause (37) is inputted to the C register, and "0" is inputted to all of the other registers. If the kind of the error cause is the non-fatal error, the data indicating the error cause (37) is inputted to the D register, and "0" is inputted to all of the other registers. If the kind of the error cause is the correctable error, the data indicating the error cause (37) is inputted to the E register, and "0" is inputted to all of the other registers. The error cause register 3 outputs the data of the A to E registers to the BMC interrupt report register 41.

The BMC interrupt report register 41 includes L1 to L5 registers corresponding to the A to E registers included in the error cause register 3. That is, the data of the A register is inputted to the L1 register, the data of the B register is inputted to the L2 register, the data of the C register is inputted to the L3 register, the data of the D register is inputted to the L4 register, and the data of the E register is inputted to the L5 register. In the setting of FIG. 4 (indicated by a solid circle, and hereafter, similarly indicated), if "1" is inputted to any of the L1 register, the L2 register and the L5 register among them, the BMC interrupt report register 41 outputs the instruction to the interrupt controller 48. Thus, if the kind of the error cause is any of the fatal error, the uncorrectable error [1] and the correctable error, the interrupt controller 48 can report the interrupt to the BMC 14. Also, the BMC interrupt report register 41 outputs the data of the L1 to L5 registers to the active SMI interrupt report register 42 of the CPU interrupt report register 46.

The active SMI interrupt report register 42 includes M1 to M5 registers corresponding to the L1 to L5 registers. That is, the data of the L1 register is inputted to the M1 register, the data of the L2 register is inputted to the M2 register, the data of the L3 register is inputted to the M3 register, the data of the L4 register is inputted to the M4 register, and the data of the L5 register is inputted to the M5 register. In the setting of FIG. 4, if "1" is inputted to any of the M1 register, the M2 register and the M3 register among them, the active SMI interrupt report register 42 outputs the interrupt to the active/standby judging circuit 47. Thus, if the kind of the error cause is the fatal error, the uncorrectable error [1] and the uncorrectable error [2], the active/standby judging circuit 47 can report a SMI (System Management Interrupt) to the active CPU through the interrupt controller 48. Also, the active SMI interrupt report register 42 outputs the data of the M1 to M5 registers to the active IRQ interrupt report register 43.

The Active IRQ interrupt report register 43 includes N1 to N5 registers corresponding to the M1 to M5 registers. That is, the data of the M1 register is inputted to the N1 register, the data of the M2register is inputted to the N2 register, the data of the M3 register is inputted to the N3 register, the data of the M4register is inputted to the N4 register, and the data of the M5 register is inputted to the N5 register. In the setting of FIG. 4, if "1" is inputted to the M4 register among them, the active IRQ interrupt report register 43 outputs the interrupt to the active/standby judging circuit 47. Thus, if the kind of the error cause is the non-fatal error, the active/standby judging circuit 47 can report an IRQ (Interrupt ReQuest) to the active CPU through the interrupt controller 48. Also, the active IRQ interrupt report register 43 outputs the data of the N1 to N5 registers to the standby SMI interrupt report register 44.

The standby SMI interrupt report register 44 includes O1 to O5 registers corresponding to the N1 to N5 registers. That is, the data of the N1 register is inputted to the O1 register, the data of the N2 register is inputted to the O2 register, the data of the N3 register is inputted to the O3 register, the data of the N4 register is inputted to the O4 register, and the data of the N5 register is inputted to the O5register. In the setting of FIG. 4, if "1" is inputted to the O1register, the O2 register, the O3 register and the O4 register among them, the standby SMI interrupt report register 44 outputs the interrupt to the active/standby judging circuit 47. Thus, if the kind of the error cause is any of the fatal error, the uncorrectable error [1], the uncorrectable error [2] and the non-fatal error, the active/standby judging circuit 47 can report the SMI to the standby CPU through the interrupt controller 48. Also, the standby SMI interrupt report register 44 outputs the data of the O1 to O5 registers to the standby IRQ interrupt report register 45.

The standby IRQ interrupt report register 45 includes P1 to P5 registers corresponding to the O1 to O5 registers. That is, the data of the O1 register is inputted to the P1 register, the data of the O2 register is inputted to the P2register, the data of the O3register is inputted to the P3 register, the data of the O4 register is inputted to the P4 register, and the data of the O5 register is inputted to the P5register. In the setting of FIG. 4, even if "1" is inputted to any of the registers, the standby IRQ interrupt report register 45 does not output the interrupt to the active/standby judging circuit 47. Thus, irrespective of the kind of the error cause, the active/standby judging circuit 47 does not report the IRQ to the standby CPU through the interrupt controller 48.

Here, FIG. 4 shows an example of the setting of the BMC interrupt report register 41 and the CPU interrupt report register 46. The report or non-report of the interrupt can be set at the desirable states.

The active/standby judging circuit 47 determines whether or not the interrupt (SMI, IRQ) from the CPU interrupt report register 46 is outputted to the interrupt controller 48, based on the data of the active CPU=CPU 11, the standby CPU=CPU 21 stored in the CPU module mode register 6. That is, the active/standby judging circuit 47 on the CPU 11 side, if receiving the interrupt from the active SMI interrupt report register 42, outputs the SMI to the interrupt controller 48, and if receiving the interrupt from the active IRQ interrupt report register 43, outputs the IRQ to the interrupt controller 48. The active/standby judging circuit 47 on the CPU 21 side, if receiving the interrupt from the standby SMI interrupt report register 44, outputs the SMI to the interrupt controller 48, and if receiving the standby IRQ interrupt report register 45, outputs the IRQ to the interrupt controller 48.

The interrupt controller 48, if receiving the interrupt from the BMC interrupt report register 41, reports the interrupt to the BMC 14. The interrupt controller 48, if receiving the interrupt from the active/standby judging circuit 47, reports the interrupt of the SMI or IRQ to the CPU 11 or CPU 21.

With reference to FIG. 2, the visible setting register 5 masks the particular register(s) of the error cause register 3 such that the particular register(s) cannot be read, when the CPUs (11, 12) read the error cause register 3.

Figure 5:
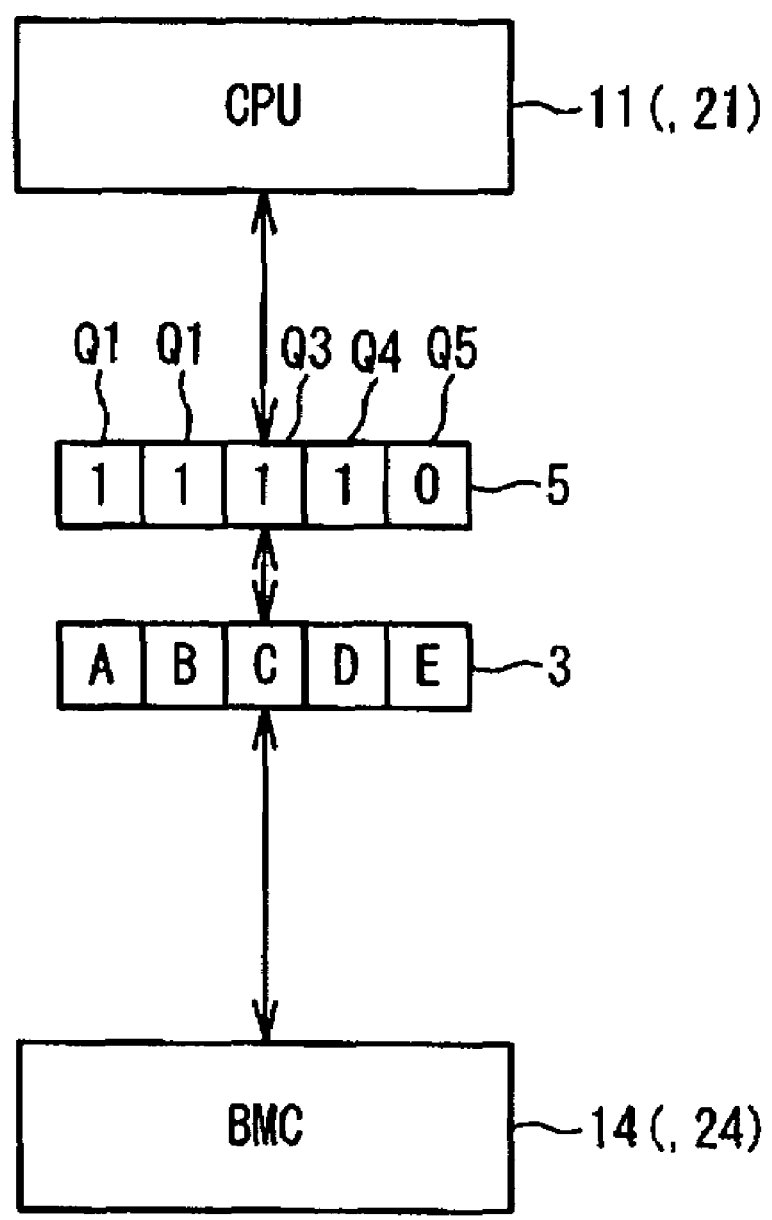
FIG. 5 is a block diagram showing the visible setting register.

Here, the visible setting register 5 is further explained. FIG. 5 is a block diagram showing the visible setting register 5. The visible setting register 5 includes Q1 to Q5 registers. When the CPU (11, 21) reads data from the A to E registers of the error cause register 3, an AND operation result of the A to E registers and the Q1 to Q5 registers is outputted to the CPU (11, 21). Thus, in the case of the setting of FIG. 5, the data of the E register is masked and is not viewed from the CPUs (11, 21). That is, the CPU (11, 21) cannot recognize the interrupt of the correctable error.

Here, FIG. 5 shows an example of the setting of the visible setting register 5 is the example. The mask of the report of the interrupt can be set at a desirable state.

The embodiment of the method for dealing with errors (the operation of the embodiment of the computer system) of the present invention will be described below with reference to the attached drawings. FIGS. 6, 8, 10, 12 and 14 are flowcharts showing the embodiment of the method for dealing with errors (the operation of the embodiment of the computer system) of the present invention. FIGS. 7, 9, 11, 13 and 15 are schematic views showing the state of the computer system in the method for dealing with errors of the present invention.

At first, the OS sets each of the interrupt report registers in the duplicated use manner when the system is duplicated. The setting includes the settings shown in FIGS. 2 to 4.

Figure 6:
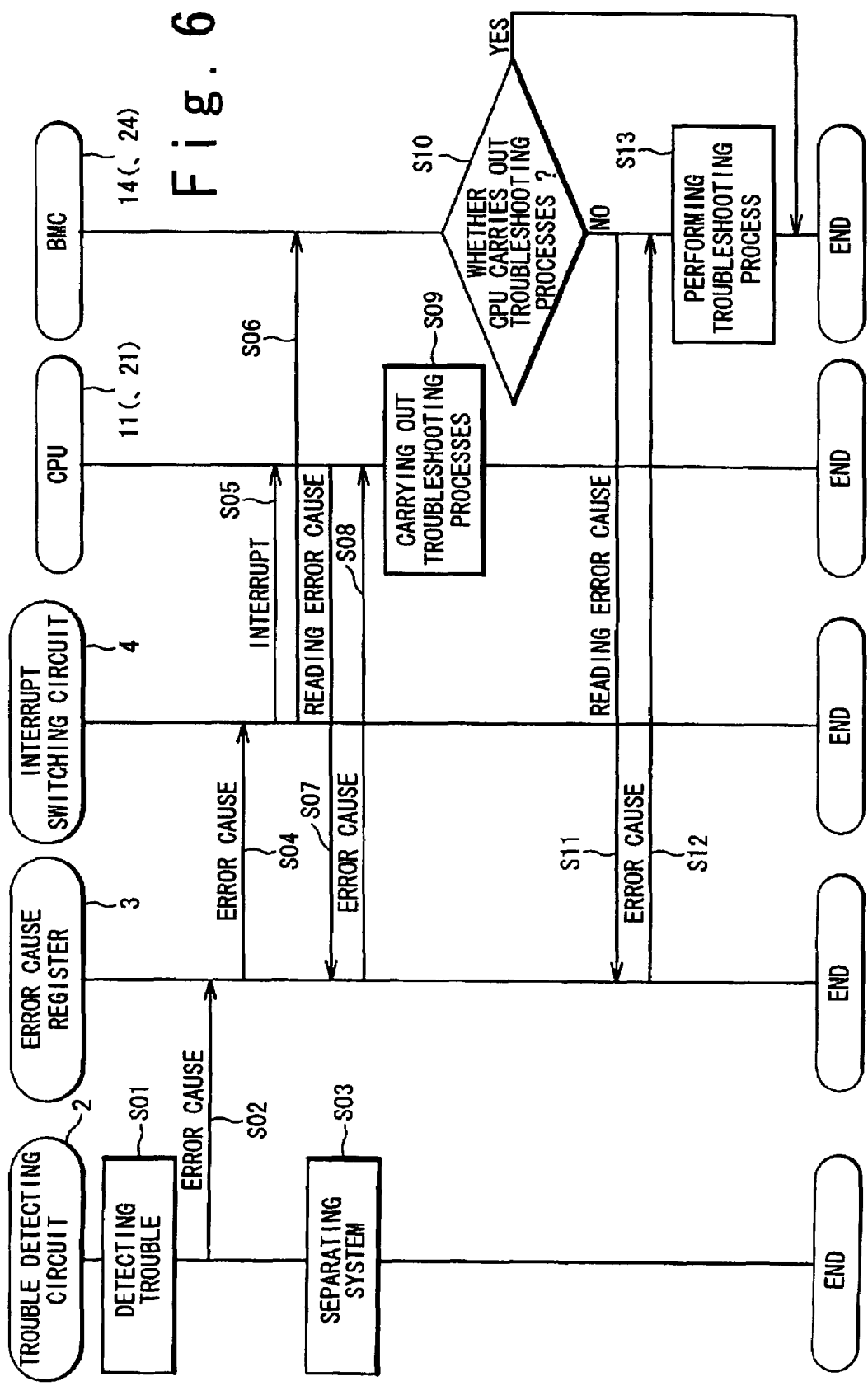
FIG. 6 is the flowchart showing the method for dealing with errors in the case that the fatal error occurs.

The case that the fatal error occurs will be described below. FIG. 6 is the flowchart showing the method for dealing with errors in the case that the fatal error occurs.

Figure 7:
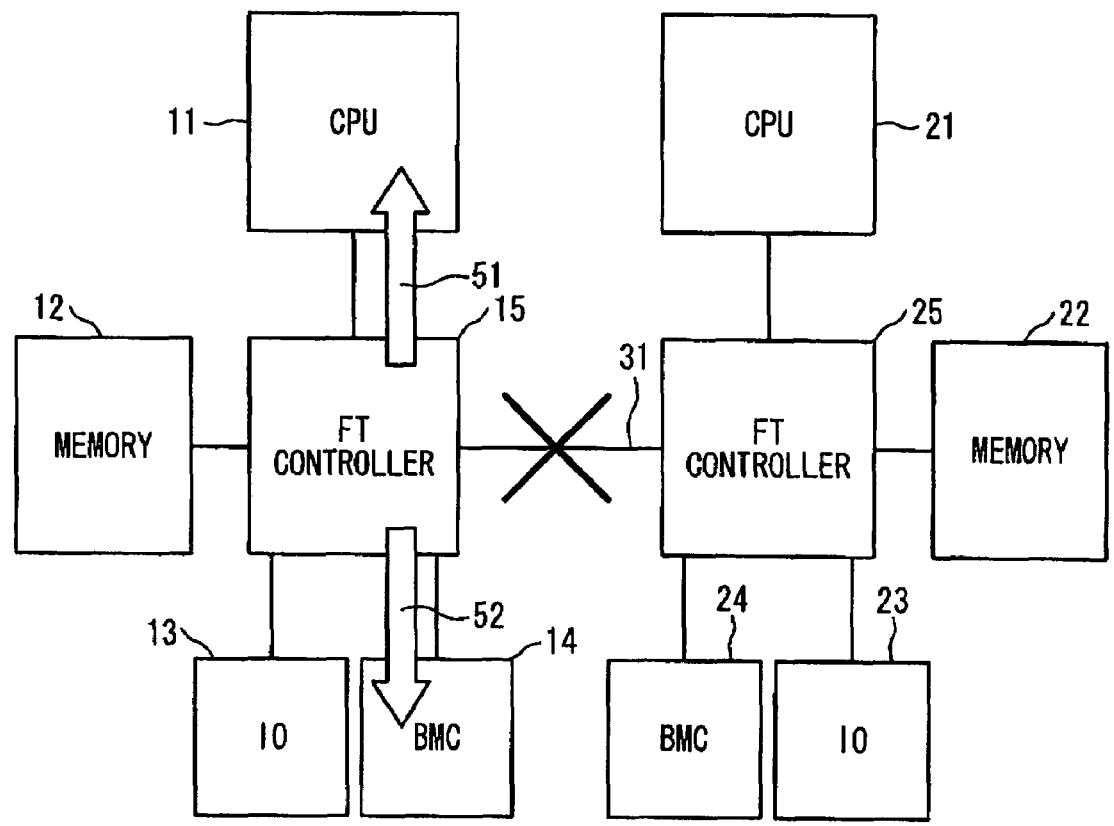
FIG. 7 is a schematic view showing the state of the computer system in the method for dealing with the fatal error.

The trouble detecting circuit 2 detects the heavy trouble of the chip set including the FT controller (e.g. 25) (Step S01). The trouble detecting circuit 2 reports the error cause of the fatal error to the error cause register 3 (Step S02). Also, the trouble detecting circuit 2 separates the system (e.g. the second system 20) on the side where the trouble occurs from the system under the operation (e.g. the first system 10) (Step S03). FIG. 7 is a schematic view showing this state of the computer system.

Next, the error cause register 3 outputs the error cause and the kind of the error to the interrupt switching circuit 4 (Step S04). The interrupt switching circuit 4 outputs the interrupts (an SMI interrupt 51 and a BMC interrupt 52) to the CPU (e.g. 11) and the BMC (e.g. 14) based on the setting of FIG. 4 (Steps S05, S06). When the CPU (e.g. 11=an interrupt handler of OS) receives the interrupt, the OS reads the error cause register 3 if it is operable (Steps S07, S08). The OS carries out preset troubleshooting processes (e.g. a log collecting, a trouble recovering process) based on of the error cause (Step S09).

The BMC (e.g. 14) monitors whether or not the CPU (e.g. 11=OS) is operated (Step S10). Then, if the OS is not operated (Step S10: NO), the BMC (e.g. 14) reads the error cause register 3 (Steps S11, S12). Then, the BMC (e.g. 14) performs only the log collecting on the self-memory (e.g. the non-volatile memory 33 shown in FIG. 2, hereafter similarly) based on the error cause, as the troubleshooting process (Step S13).

As mentioned above, in the case that the fatal error occurs, the computer system deals with the error.

Figure 8:
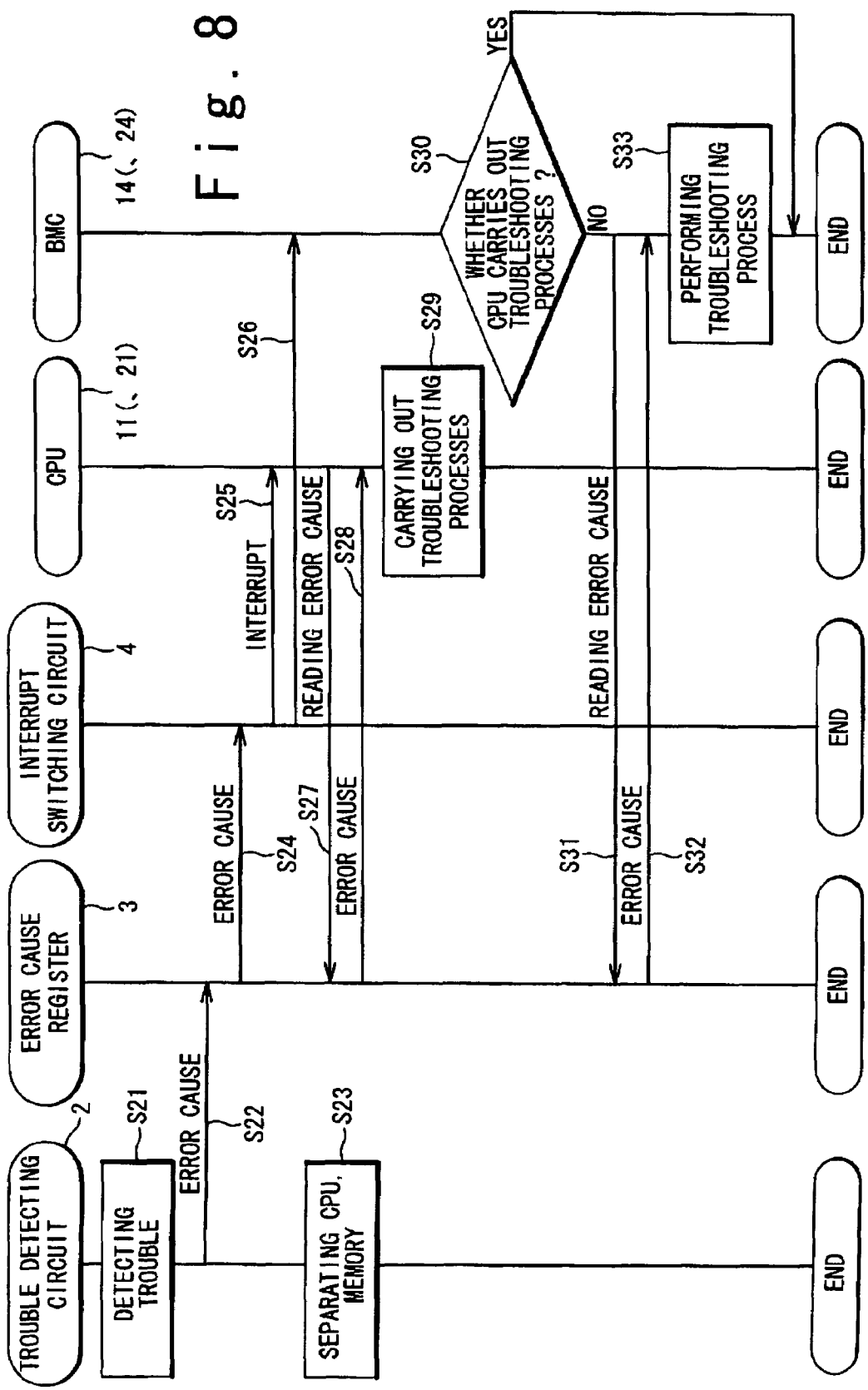
FIG. 8 is the flowchart showing the method for dealing with errors in the case that the uncorrectable error [1] occurs.

The case that the uncorrectable error [1] occurs will be described below. FIG. 8 is the flowchart showing the method for dealing with errors in the case that the uncorrectable error [1] occurs.

Figure 9:
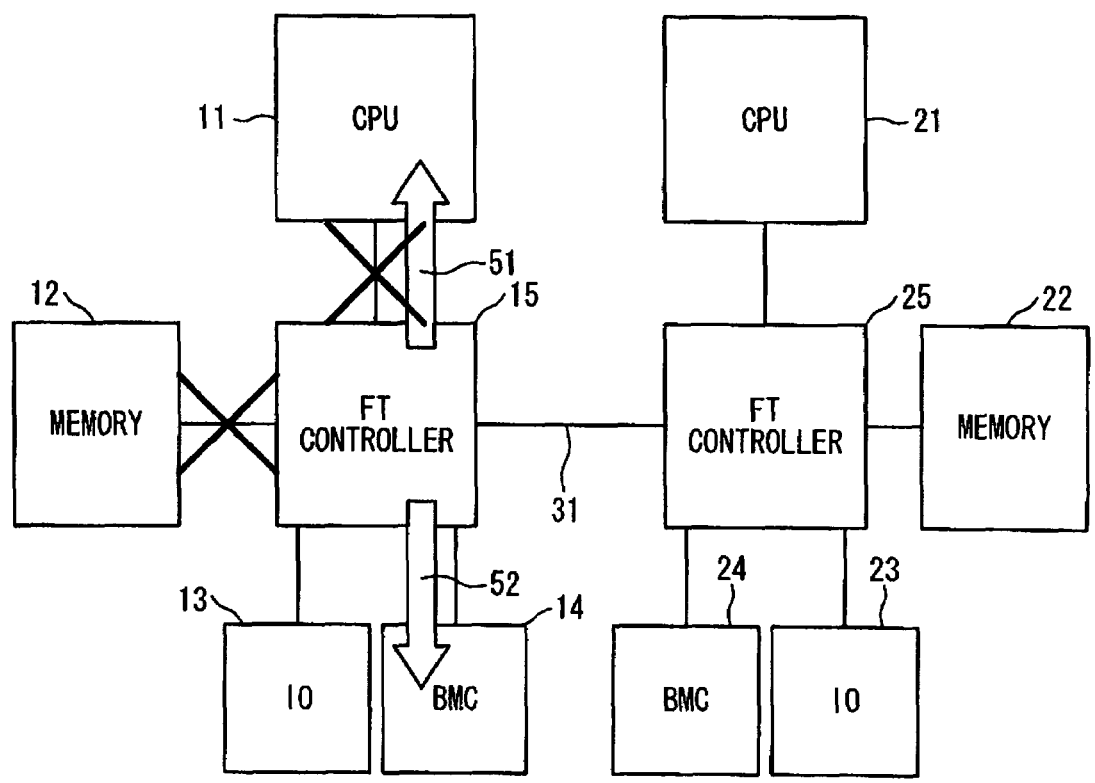
FIG. 9 is a schematic view showing the state of the computer system in the method for dealing with the uncorrectable error [1]

The trouble detecting circuit 2 detects the trouble of the CPU (e.g. 11) or the memory (e.g. 12) (Step S21). The trouble detecting circuit 2 reports the error cause of the uncorrectable error [1] to the error cause register 3 (Step S22). Also, the trouble detecting circuit 2 separates the CPU (e.g. 11) or the memory (e.g. 12) where the error occurs from the system, and continues the duplicated operation still in the other portions of the system (Step S23). FIG. 9 is a schematic view showing this state of the computer system. Here, FIG. 9 shows an example where the troubles occur in both of the CPU 11 and the memory 12.

Next, the error cause register 3 outputs the error cause and the kind of the error to the interrupt switching circuit 4 (Step S24). The interrupt switching circuit 4 outputs the interrupts (the SMI interrupt 51 and the BMC interrupt 52) to the CPU (e.g. 11) and the BMC (e.g. 14) based on the setting of FIG. 4 (Steps S25, S26). When the CPU (=the interrupt handler of OS) receives the interrupt, the OS reads the error cause register 3 if it is operable (Steps S27, S28). The OS carries out the preset troubleshooting processes (the log collecting, the trouble recovering process) based on the error cause (Step 329).

The BMC (e.g. 14) monitors whether or not the CPU (e.g. 11=OS) is operated (Step S30). Then, if the OS is not operated (Step S30: NO), the BMC (e.g. 14) reads the error cause register 3 (Steps S31, S32). Then, the BMC (e.g. 14) performs only the log collecting on the self-memory based on the error cause, as the troubleshooting processes (Step S33).

As mentioned above, in the case that the uncorrectable error [1] occurs, the computer system deals with the error.

Figure 10:
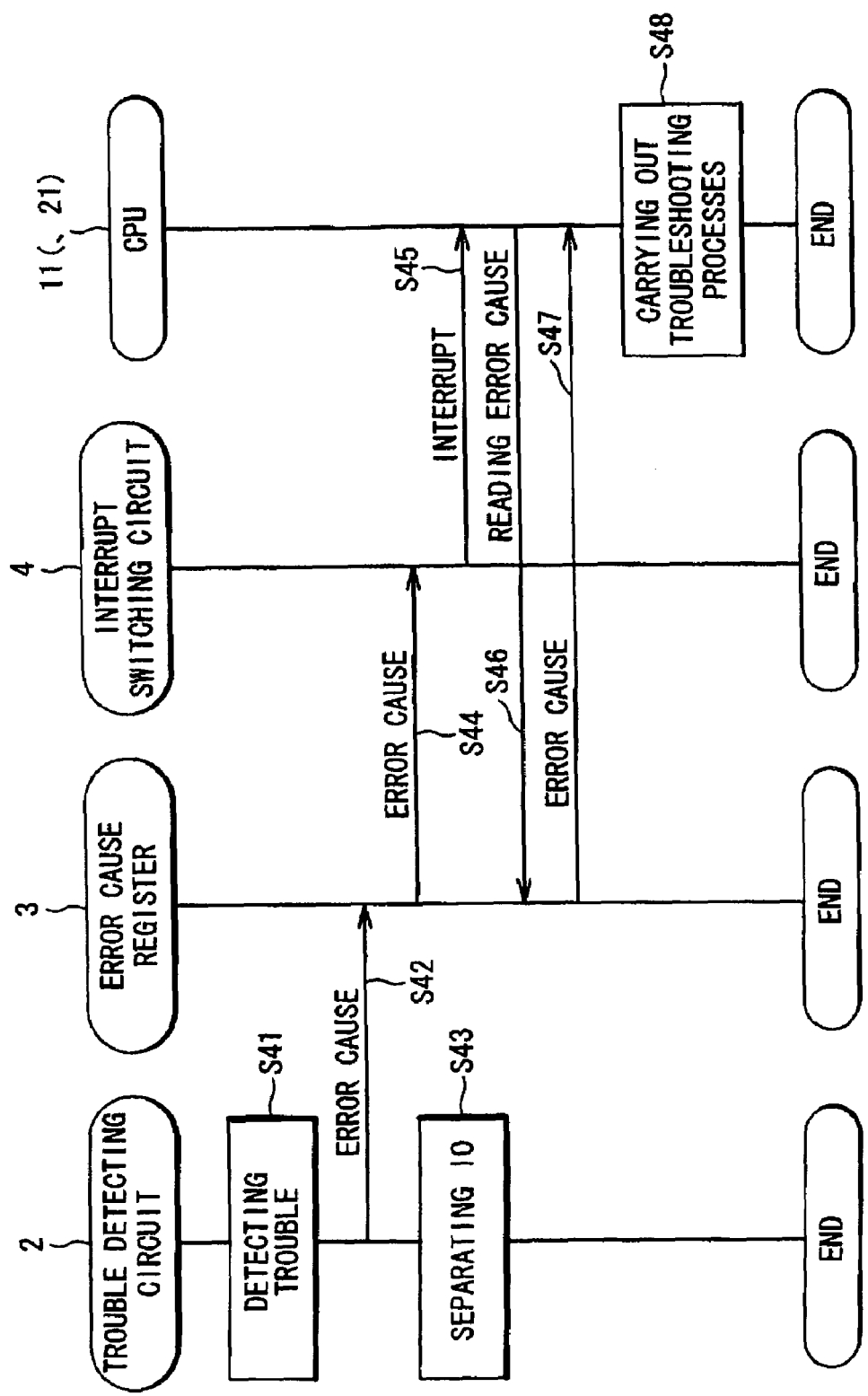
FIG. 10 is the flowchart showing the method for dealing with errors in the case that the uncorrectable error [2] occurs.

The case that the uncorrectable error [2] occurs will be described below. FIG. 10 is the flowchart showing the method for dealing with errors in the case that the uncorrectable error [2] occurs.

Figure 11:
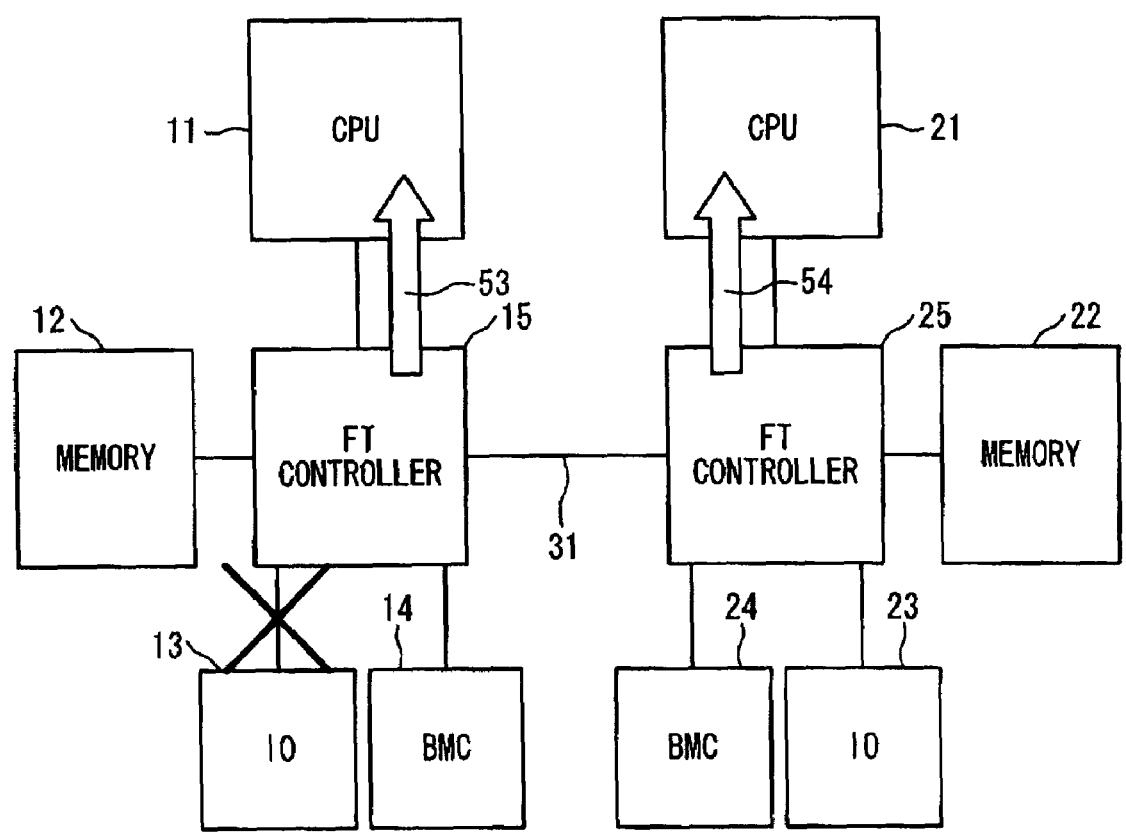
FIG. 11 is a schematic view showing the state of the computer system in the method for dealing with the uncorrectable error [2]

The trouble detecting circuit 2 detects the trouble of the I/O device (e.g. 13) (Step S41). The trouble detecting circuit 2 reports the error cause of the uncorrectable error [2] to the error cause register 3 (Step S42). Also, the trouble detecting circuit 2 separates the I/O device (e.g. 13) where the trouble occurs from the system, and continues the duplicated operation still in the other portions of the system (Step S43). FIG. 11 is a schematic view showing this state of the computer system.

Next, the error cause register 3 outputs the error cause and the kind of the error to the interrupt switching circuit 4 (Step S44). The interrupt switching circuit 4 outputs the interrupts (an SMI interrupt 53 and an SMI interrupt 54) to the CPU (e.g. 11) based on the setting of FIG. 4 (Step S45). When the CPU (=the interrupt handler of OS) receives the interrupt, the OS reads the error cause register 3 (Steps S46, S47). The OS carries out the preset troubleshooting processes (the log collecting, the trouble recovering process) based on the error cause (Step S48).

As mentioned above, in the case that the uncorrectable error [2] occurs, the computer system deals with the error.

Figure 12:
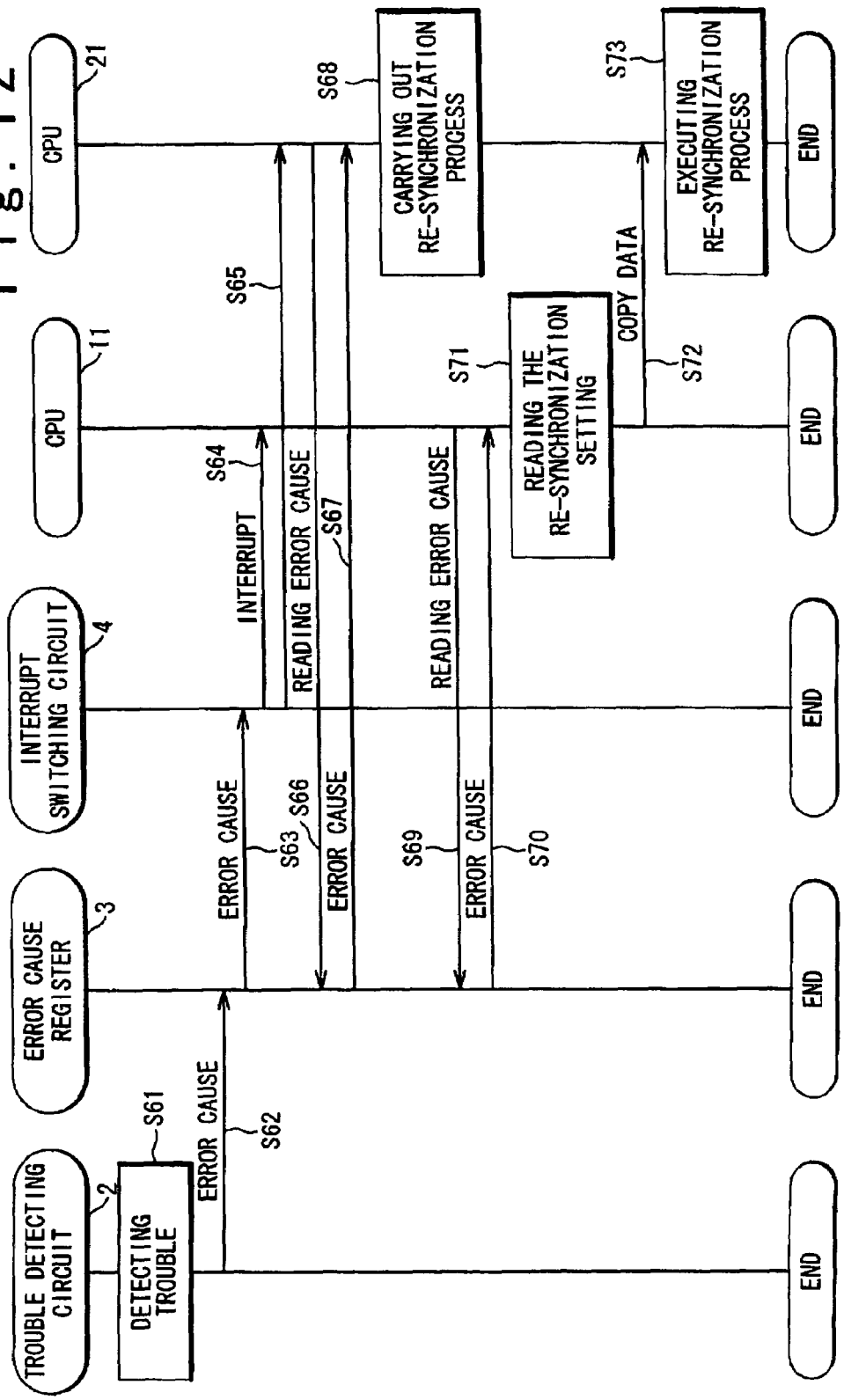
FIG. 12 is the flowchart showing the method for dealing with errors in the case that the non-fatal error occurs.

The case that the non-fatal error occurs will be described below. FIG. 12 is the flowchart showing the method for dealing with errors in the case that the non-fatal error occurs.

Here, let us suppose that the OS sets the CPU 11 as the CPU (active CPU) to be mainly operated, and sets the CPU 21 as the CPU (standby CPU) to be auxiliarily operated. Similarly, let us suppose that the OS sets the interrupt reported to the active CPU side as the normal interrupt (IRQ) and sets the interrupt reported to the standby CPU side as the SMI (system management interrupt).

The trouble detecting circuit 2 detects the mismatching between the operation of the first system 10 and the operation of the second system 20 (Step S61). The trouble detecting circuit 2 reports the error cause of the non-fatal error to the error cause register 3 (Step S62). The error cause register 3 outputs the error cause and the kind of the error to the interrupt switching circuit 4 (Step S63).

The CPU interrupt report register 46 of the interrupt switching circuit 4 outputs the interrupts of the active IRQ interrupt report register 43 and the standby SMI interrupt report register 44 to the active/standby judging circuit 47, based on the setting shown in FIG. 4. The active/standby judging circuit 47 reports the interrupt of any one of the active IRQ interrupt report register 43 and the standby SMI interrupt report register 44 to the interrupt controller 48, based on the information preset for the CPU module mode register 6. The interrupt controller 48 reports an IRQ interrupt 55 on the active side to the CPU (e.g. 11) on the active side (Step S64) and reports an SMI interrupt 56 on the standby side to the CPU (e.g. 21) on the standby side (Step S65). In this way, the different interrupts can be reported to the CPU (e.g. 11) on the active side and the CPU (e.g. 21) on the standby side.

Figure 13:
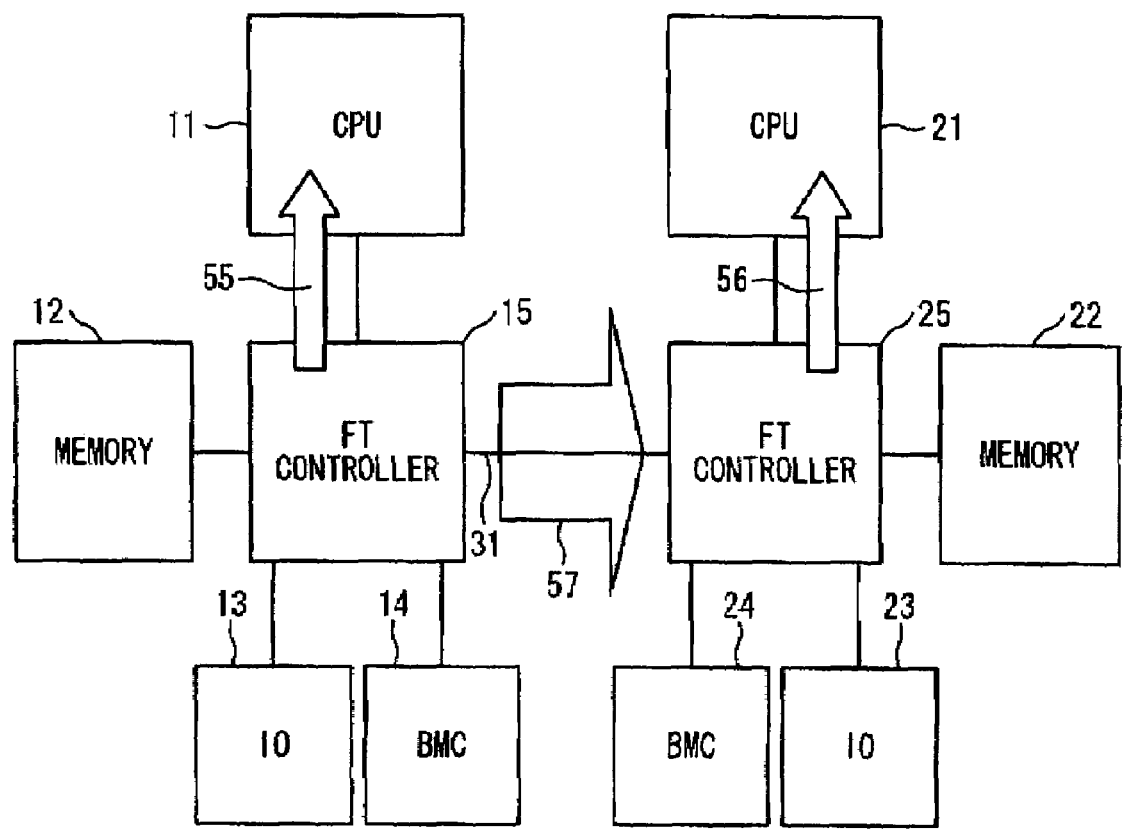
FIG. 13 is a schematic view showing the state of the computer system in the method for dealing with the non-fatal error.

The CPU (e.g. 21=the interrupt handler of OS) on the standby side, if receiving the SMI interrupt, reads the error cause register 3 (Steps S66, S67) and carries out the process necessary for the re-synchronization (Step S68). Then, the CPU on the standby side waits for the instruction from the CPU (e.g. 11) on the active side. The CPU (e.g. 11=the interrupt handler of OS) on the active side, if receiving the IRQ interrupt, reads the error cause register 3 (Steps S69, S70). Then, the CPU on the active side reads the setting necessary for the re-synchronization to the standby side CPU (Step S71) and carries out its copy process 57 (Step S72). FIG. 13 is a schematic view showing this state of the computer system. After that, the CPU on the standby side can execute the re-synchronization process (Step S73), and the duplicated operation is again started.

As mentioned above, in the case that the non-fatal error occurs, the computer system deals with the error.

Figure 14:
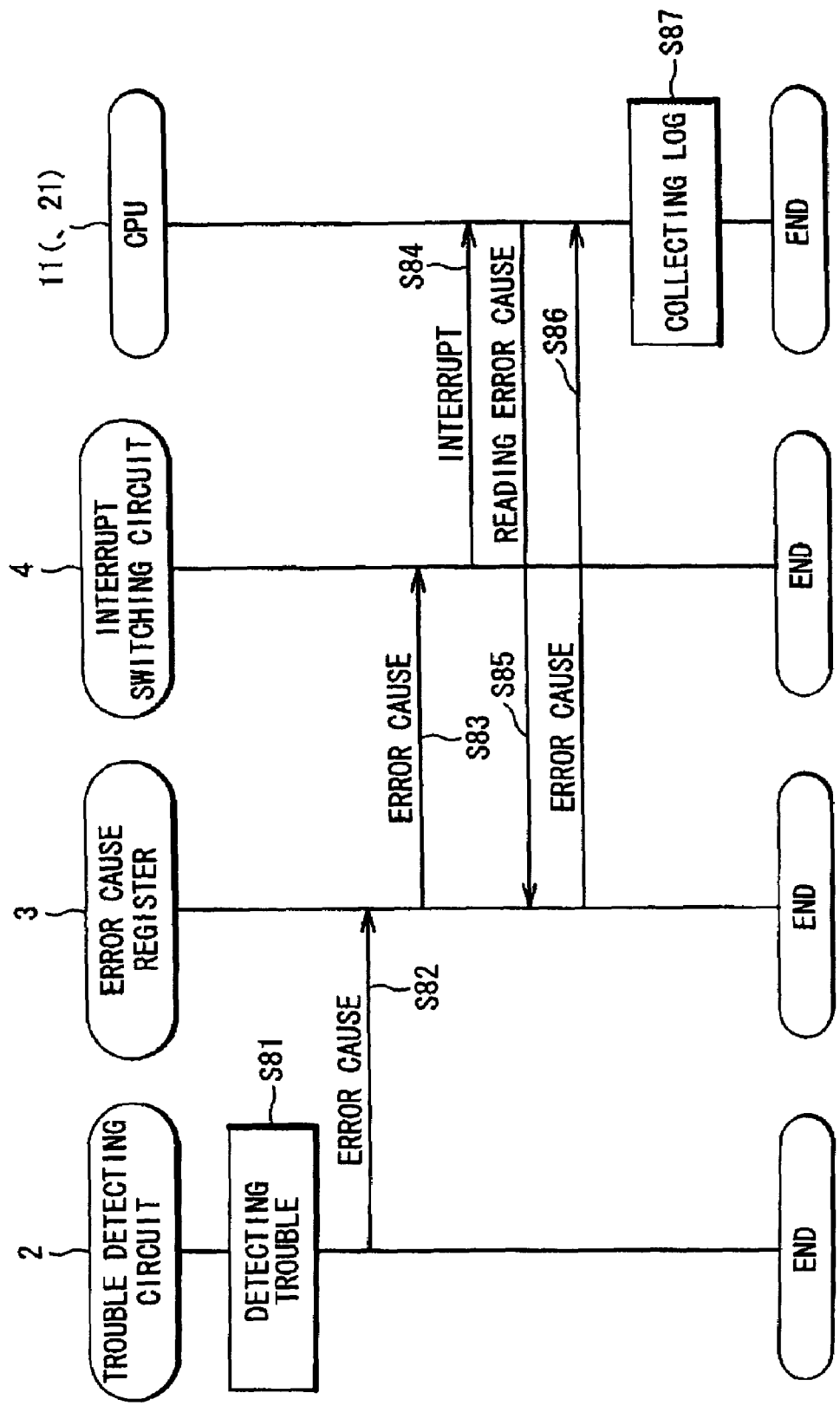
FIG. 14 is the flowchart showing the method for dealing with errors in case that the correctable error occurs.

The case that the correctable error occurs will be described below. FIG. 14 is the flowchart showing the method for dealing with errors in case that the correctable error occurs.

Figure 15:
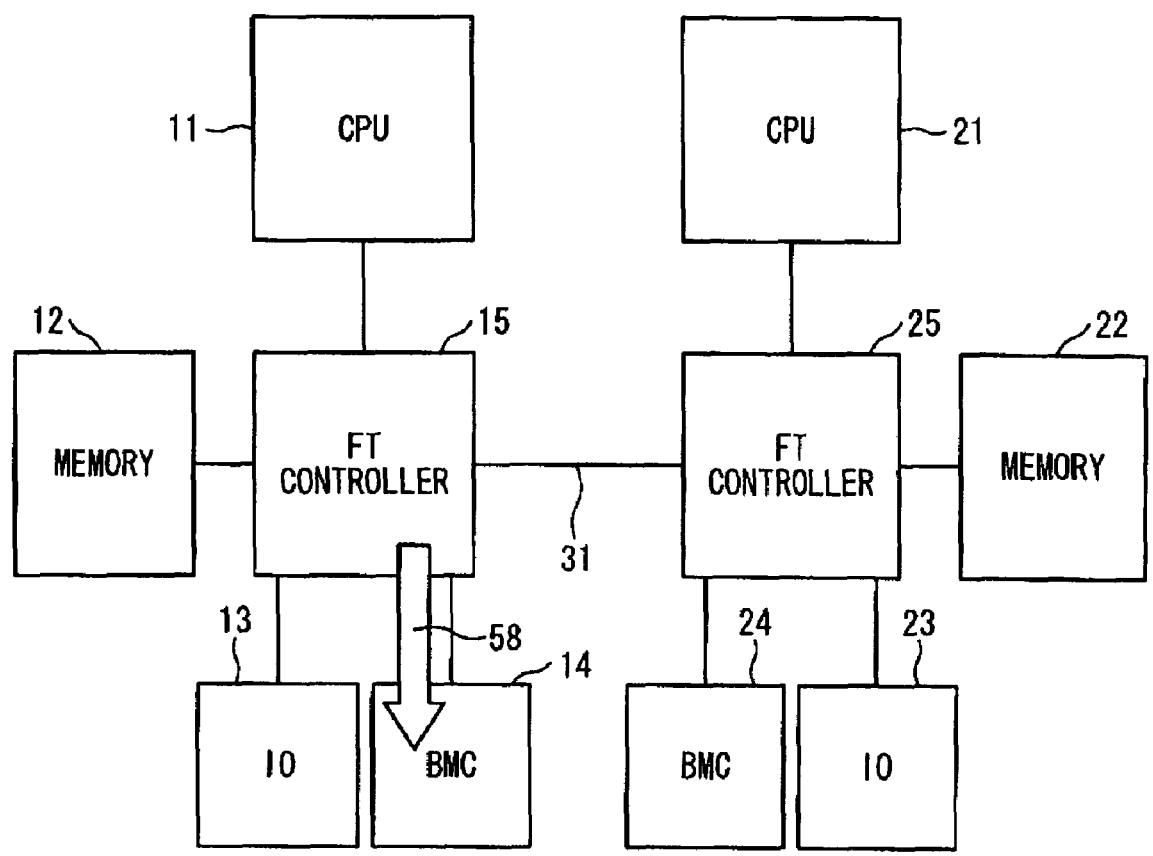
FIG. 15 is a schematic view showing the state of the computer system in the method for dealing with the correctable error.

The trouble detecting circuit 2 detects a predetermined light trouble (Step S81). The trouble detecting circuit 2 reports the error cause of the correctable error to the error cause register 3 (Step S82). The error cause register 3 outputs the error cause and the kind of the error to the interrupt switching circuit 4 (Step S83). The interrupt switching circuit 4 outputs the interrupt (BMC interrupt 58) to the BMC (e.g. 14) based on the setting of FIG. 4 (Step S84). FIG. 15 is a schematic view showing this state of the computer system.

The BMC (e.g. 14), when receiving the interrupt, reads the error cause register 3 (Steps S85, S86). The BMC (e.g. 14) performs only the log collecting on the self-memory based on the error cause (Step S87). At this time, the CPU (e.g. 14=OS) does not receive the interrupt report. Thus, the CPU does not recognize that the error occurs and does not read the error cause register 3. Then, the CPU continues the operation.

Here, at that time, for example, if a different error simultaneously occurs, the OS reads the error cause register 3. In this case, if there is not a visible setting register 6, a difference is generated in the error cause register 3, between the first system 10 and the second system 20, and the desynchronization occurs. For this reason, in the present invention, the visible setting register 6 is installed. Then, the OS preliminarily performs the mask setting for the correctable error on the visible setting register 6, as shown in FIG. 5. Consequently, if the error cause register 3 is read from the CPU (OS) side, the data where the error cause register 3 and the visible setting register 6 are AND-operated is returned to the OS. For this reason, the masked portion is not viewed from the OS. That is, for example, even if the different error simultaneously occurs and the OS reads the error cause register 3, the desynchronization does not occur.

As mentioned above, in the case that the correctable error occurs, the computer system deals with the error.

In this way, the present invention, by installing the register that can select the plurality of interrupts, the generated interrupt can be changed and the device for executing the process and the content of the process can be changed through the process for dealing with errors. Also, since the mask register is installed such that the error cause is not viewed from the CPU side, without any fact that the CPU (=OS) recognizes the error occurring, the process for dealing with errors can be executed only in the BMC.

According to the present invention, with regard to the error in the multiplexed computer system, the destination of the interrupt report regarding an error can be changed based on the influence level on the system. Consequently, the system can deal with the error based on an influence level on the system.

It is apparent that the present invention is not limited to the above embodiment, that may be modified and changed without departing form the scope and spirit of the invention.

What is claimed is:

1. A computer system comprising:
   a plurality of systems which are connected to each other by links and which operate synchronously with each other, wherein each of said plurality of systems comprises:
   a fault tolerant controller;
   a CPU connected to said fault tolerant controller;
   a baseboard management controller connected to said fault tolerant controller; and
   a plurality of hardware modules connected to said fault tolerant controller,
   wherein if an error is detected which occurs in a portion of any of said plurality of systems, said fault tolerant controller of a system of the plurality of systems outputs an interrupt signal regarding said error to at least one of said CPU and said baseboard management controller of said system based on said error and said fault tolerant controller of said system separates said system from said portion of said system in which said detected error occurs.

2. The computer system according to claim 1, wherein said fault tolerant controller comprises:
   a trouble detecting circuit which determines a cause and a kind of said error;
   an error cause storage unit which stores said cause and said kind of said error; and
   an interrupt switching circuit which outputs said interrupt signal to said at least one of said CPU and said baseboard management controller based on said cause and said kind of said error.

3. The computer system according to claim 2, wherein if said error occurs in another system of said plurality of systems,
   said trouble detecting circuit separates said other system in which said error occurs from said system having said trouble detecting circuit, and
   said interrupt switching circuit outputs said interrupt to said CPU and said baseboard management controller.

4. The computer system according to claim 2, wherein if said error occurs in one of said CPU and a memory as one of said plurality of hardware modules,
   said trouble detecting circuit separates said one of said CPU and said memory in which said error occurs, and
   said interrupt switching circuit outputs said interrupt to said CPU and said baseboard management controller.

5. The computer system according to claim 2, wherein if said error occurs in a I/O device as one of said plurality of hardware modules,
   said trouble detecting circuit separates said I/O device in which said error occurs, and
   said interrupt switching circuit outputs said interrupt to said CPU.

6. The computer system according to claim 2, wherein said fault tolerant controller further comprises:
   a CPU module mode storage unit which stores CPU mode data, said CPU mode data indicating whether said fault tolerant controller is connected to at least one of an active CPU and a standby CPU, and
   if said error is directed to a multiplexing of said plurality of systems, said interrupt switching circuit outputs said interrupt to said CPU which is connected to said interrupt switching circuit, based on said CPU mode data in said CPU module mode storage unit.

7. The computer system according to claim 2, wherein if said error can be corrected by one of said plurality of hardware modules,
said interrupt switching circuit outputs said interrupt to said baseboard management controller.

8. The computer system according to claim 2, wherein said at least one of said CPU and said baseboard management controller which receives said interrupt regarding said error reads said cause from said error cause storage unit and carries out error handling based on said error.

9. The computer system according to claim 8, wherein said fault tolerant controller further comprises:
a visible setting storage unit which masks said cause based on said kind if said CPU reads said cause from said error cause storage unit.

10. A method for interrupt handling of errors in a multiplexed computer system, the method comprising:
(a) determining a cause and a kind of an error which occurs in a portion of any of a plurality of systems included in the multiplexed computer system, wherein said systems are connected to each other by links and operate synchronously with each other; and
(b) at a system of the plurality of systems, outputting an interrupt signal regarding said error to at least one destination of said system based on said kind of said error; and
(c) at the system, separating said system from said portion of said system in which said detected error occurs,
wherein each of said plurality of systems comprises:
a fault tolerant controller;
a CPU connected to said fault tolerant controller;
a baseboard management controller connected to said fault tolerant controller; and
plurality of hardware modules connected to said fault tolerant controller, and
wherein step (b) comprises:
(b1) at said fault tolerant controller of said system, outputting said interrupt to at least one of said CPU and said baseboard management controller of said system based on said kind of said error.

11. The method according to claim 10, wherein said fault tolerant controller comprises:
a trouble detecting circuit which determines the cause and the kind of said error;
an error cause storage unit connected to said trouble detecting circuit which stores said cause and said kind of said error; and
an interrupt switching circuit connected to said error cause storage unit which outputs said interrupt signal to said at least one of said CPU and said baseboard management controller based on said cause and said kind of error,
wherein step (a) comprises:
(a1) said trouble detecting circuit determining said cause and said kind of said error; and
(a2) said error cause storage unit storing said cause and said kind of said error, and
wherein said step (b1) comprises:
(b11) said interrupt switching circuit outputting said interrupt signal to said at least one of said CPU and said baseboard management controller of said system.

12. The method for dealing with errors according to claim 11, wherein if said error occurs in another system of said plurality of systems,
step (b1) further comprises:
(b12) said trouble detecting circuit separating said other system in which said error from said system; and
(b13) said interrupt switching circuit outputting said interrupt signal to said CPU and said baseboard management controller of said system.

13. The method according to claim 11, wherein if said trouble occurs in at least one of said CPU and a memory as one of said plurality of hardware modules of said system,
step (b1) further comprises:
(b14) said trouble detecting circuit separating said at least one of said CPU and said memory of said system where said error occurs from said system; and
(b15) said interrupt switching circuit outputting said interrupt signal to said CPU and said baseboard management controller of said system.

14. The method according to claim 11, wherein if said error occurs in a I/O device as one of said plurality of hardware modules of said system,
step (b1) further comprises:
(b16) said trouble detecting circuit separating said I/O device of said system from said system; and
(b17) said interrupt switching circuit outputting said interrupt signal to said CPU of said system.

15. The method according to claim 11, wherein said fault tolerant controller further comprises:
a CPU module mode storage unit which stores CPU mode data, said CPU mode data indicating whether said fault tolerant controller is connected to at least one of an active CPU and a standby CPU, and
if said error is directed to a multiplexing of said plurality of systems, said step (b1) further comprises:
(b18) said interrupt switching circuit outputting said interrupt signal to said CPU which is connected to said interrupt switching circuit, based on said CPU mode data in said CPU module mode storage unit.

16. The method according to claim 11, wherein if said error can be corrected by one of said plurality of hardware modules, said step (b1) further comprises:
(b19) said interrupt switching circuit outputting said interrupt signal to said baseboard management controller of said system.

17. The method according to claim 11, further comprising:
(c) said at least one of said CPU and said baseboard management controller which receives said interrupt signal reading said cause of said error from said error cause storage unit and handling said error based on said cause.

18. The method according to claim 17, wherein said fault tolerant controller further comprises:
a visible setting storage unit which masks said cause based on said kind if said CPU reads said cause from said error cause storage unit, and
wherein step (c) comprises:
(c1) said visible setting storage unit masking said cause based on said kind if said CPU reads said cause from said error cause storage unit.

* * * * *